2 Sheets—Sheet 2.
S. B. HART.
Grain-Drill.
No. 221,408. Patented Nov. 11, 1879.
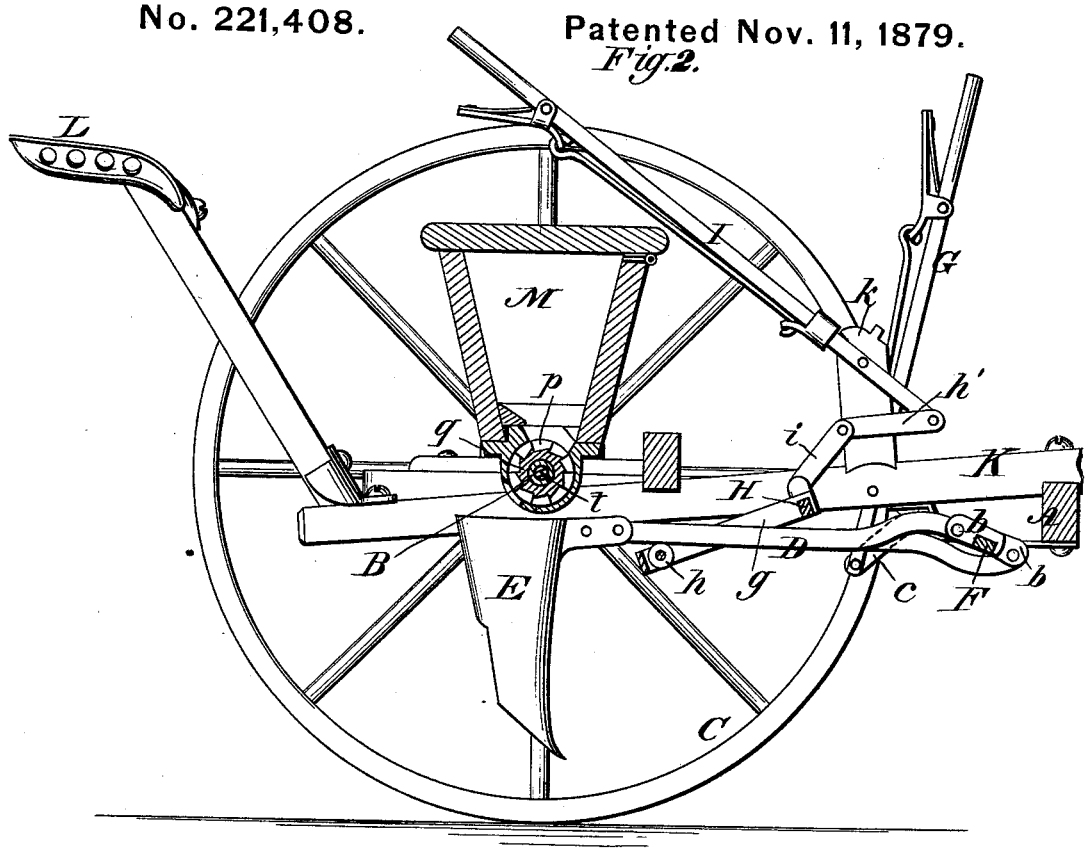
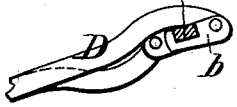
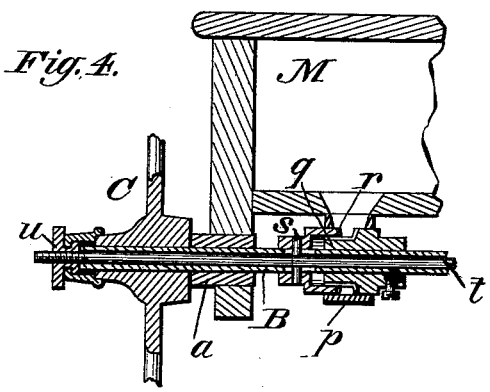
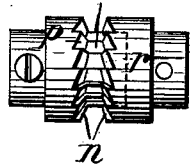
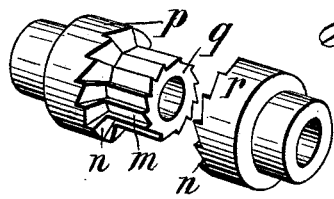
Witnesses:
Donn I. Twitchell.
William W. Dodge.
Inventor:
Stacy B. Hart.
By his Attys.
Dodge & Son

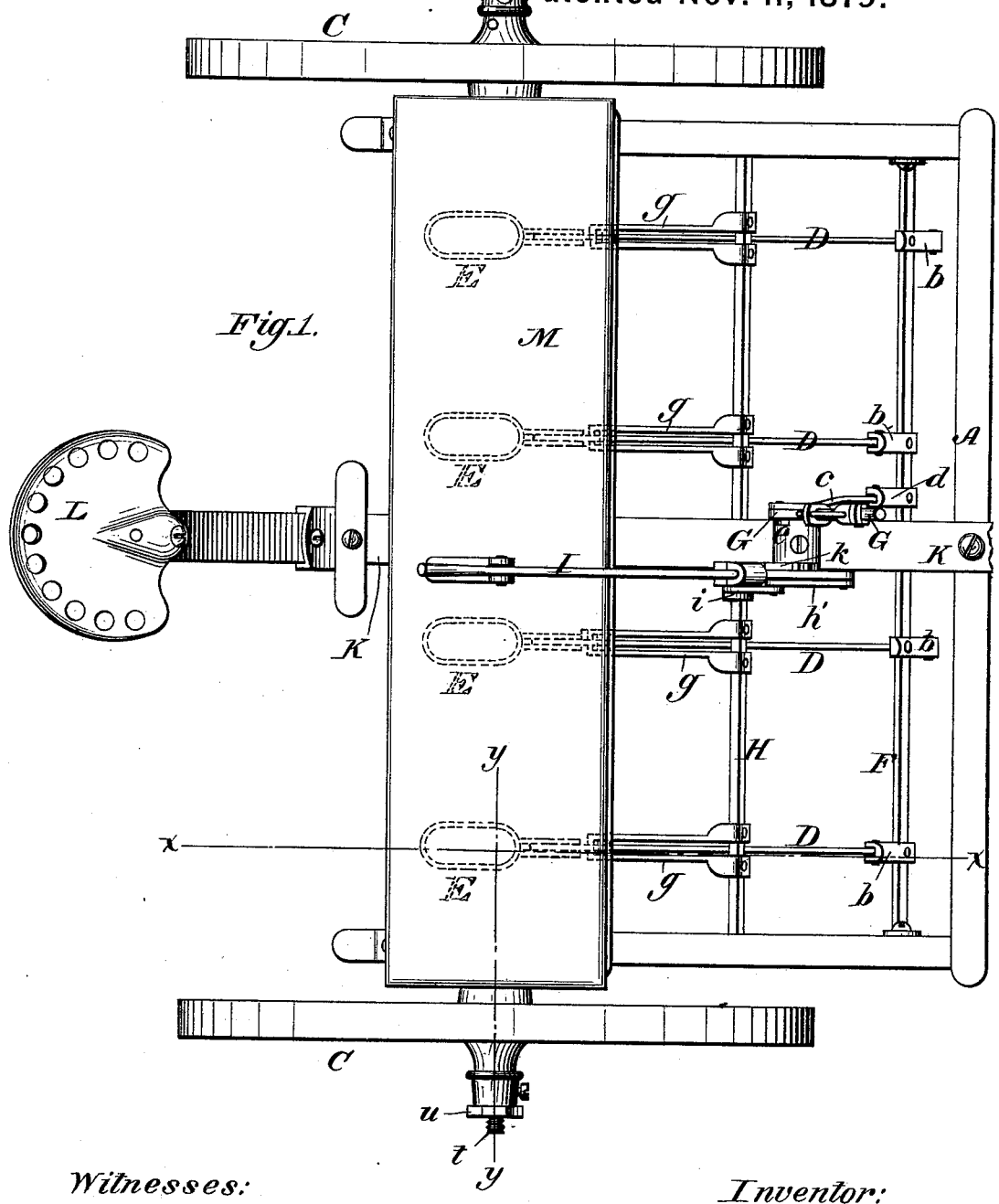

UNITED STATES PATENT OFFICE.

STACY B. HART, OF PEORIA, ILLINOIS.

IMPROVEMENT IN GRAIN-DRILLS.

Specification forming part of Letters Patent No. 221,408, dated November 11, 1879; application filed March 17, 1879.

*To all whom it may concern:*

Be it known that I, STACY B. HART, of Peoria, in the county of Peoria and State of Illinois, have invented certain Improvements in Grain-Drills, of which the following is a specification.

My invention consists in a transverse rock-shaft having slotted arms to elevate and brace the drag-bars; in providing the longitudinally-shifting drag-bars with bent or curved ends and attaching them to arms on a straight rock-shaft; and in details of the feed-rolls.

Figure 1 represents a top-plan view of my machine; Fig. 2, a longitudinal vertical section of the same; Fig. 3, a view showing the curvature and connection of the drag-bars; Fig. 4, a transverse vertical section of the machine on the line $y\ y$; Fig. 5, a perspective view of one of the feed-rolls; Fig. 6, a side elevation of the same.

In its general construction and mode of operation the machine is similar to those now in general use, consisting of a wheeled frame provided with a series of drag bars or beams having hoes attached, and with a transverse grain-hopper and rotary devices thereunder, to deliver the grain in a continuous stream into the hoes.

A represents the rigid main frame, of ordinary form and structure, bolted to the under side of two metal boxes or bearings, $a$, which are mounted loosely upon a transverse tubular shaft, B, the ends of which are sustained in two wheels, C, which latter will be connected, either or both, with the shaft by means of suitable clutches.

D represent the drag bars or beams, provided at their rear ends with the usual hoes or drill-teeth E, and pivoted at their forward ends to arms $b$ on a transverse rock-shaft, F, extending across the front of the frame, as shown.

It will be noticed that the arms extend alternately from opposite sides of the shaft, so that when it is turned every alternate bar will be moved backward and the others moved forward. It will be noticed, further, that the bars or beams are made in two lengths, alternately long and short, and so arranged that when the rock-shaft is turned forward the hoes stand in a broken or zigzag line, but that when it is turned backward they stand in a single straight line or rank.

The front ends of the bars or beams are curved or bent, it will be seen, one upward and the next downward throughout the series, this construction being adopted in order that the shaft may make a half-revolution, or nearly so, so that the bars may stand parallel and the hoes all stand at one inclination under each adjustment.

In practice it is highly important that this uniformity in the position of the hoes shall be maintained, in order that they shall enter the ground alike, and by curving the beams, as shown, I am able to secure this end without cutting, cranking, or bending the rock-shaft, as would otherwise be required.

The straight unbroken shaft is advantageous, in that it is cheaper, lighter, and stronger than a shaft having cranks or bends therein.

Any suitable means may be employed for turning the shaft F; but it is preferred to employ a hand-lever, G, mounted on the tongue or frame in advance of the hopper, and connected by a link, $c$, with an arm, $d$, on the shaft, the lever being provided with a latch or locking device, which engages in a rack-plate, $e$, to hold the lever and bars from shifting accidentally.

As a means of elevating the drag-bars and hoes, and also of bracing them against lateral movement, there is mounted across the main frame, in advance of the hopper or grain-box, a second rock-shaft, H, having a series of depending vertically-slotted arms, $g$, each provided in the lower end with a roller, $h$, and each having one of the drag-bars passed through it above the roller, as clearly represented in Figs. 1 and 2.

When the arms $g$ are turned downward they serve to prevent the bars from springing laterally, but leave them free to rise and fall with perfect freedom; but when the arms are elevated by turning the shaft H forward the rollers, acting against the under side of the bars, raise them and lift the hoes from the ground.

The shaft H may be controlled and operated by any suitable means, such, for example, as the hand-lever I, mounted on the frame and connected by a link, $h'$, with an arm, $i$, on the shaft.

As a means of holding the bars in an elevated position, the hand-lever may be provided with latching devices to engage with a fixed rack, k, or other devices employed in connection with the lever or the shaft for the same purpose.

In the construction of the machine the two rock-shafts will be made usually of a square or angular form and the arms made of malleable iron with eyes in one end to fit the shaft, so that they may be slipped thereon from the end.

In order that the levers may be controlled by the attendant while riding upon the machine, the tongue or draft-pole K, located, as usual, at the center of the machine, is extended backward beneath the hopper to a point in rear of the same and provided with a standard sustaining the driver's seat L, as shown in Figs. 1 and 2. The seat and the levers are arranged with special reference to each other, so that the driver while in the seat may readily reach and operate the levers.

This arrangement puts the hoes fully under control of the driver without destroying the proper draft and balance of the machine, and avoids the loss of time and the labor incident to the use of the ordinary machines, which require the attendant to dismount when the hoes are to be shifted, the machine turned, or the hoes lifted.

The hopper or grain-box M extends, as usual, transversely across the machine, and is secured to the main frame or the boxes a directly over the axle, which, in this machine, serves also as a feed-shaft.

The feeding devices are of that class in which the grain is delivered through a cup or case in a continuous stream by means of a horizontal roller having a circumferential groove or channel to carry the grain and determine the rate of delivery, and to that particular style of device in which the roll is made in two sections, so that the width of the channel may be varied to increase or diminish the rate of delivery. The improvements consist in providing teeth in the bottom as well as the sides of the channel, in the special form of the teeth, and in the means for adjusting the roll.

Fig. 6 represents a side view of the roll, having around its middle the continuous channel or groove having a longitudinally-toothed bottom, m, and the two flaring or outwardly-inclined toothed sides n. As shown in Figs. 2, 5, and 6, the teeth are made in the form of ordinary ratchet-teeth, upright on the front face and inclined on the rear, but on the sides of the channel are made of increasing depth as they approach the outside of the roll. This form of the teeth, combined with the inclination of the side walls of the channel, insures a steady and uniform delivery of the grain, the inclination of the channel-sides being particularly advantageous, in that it secures the ready escape and delivery when the channel is of narrow width, and when oats and other light grains are being distributed.

As shown in Figs. 4 and 5, the roll is made in two parts, one part, which is fixed upon the shaft, comprising the toothed cylinder, which forms the bottom of the channel, and a head or enlargement thereon to form one side of the channel, as shown at p, and the other part consisting in a tubular part toothed on the end and arranged to slide upon the end of the cylinder and form the remaining side of the channel, as shown at r.

By sliding the part r endwise upon part q, the width of the grain channel or passage may be increased or diminished, and thus the rate of feed regulated without changing the speed of rotation. The ends of both parts of the roll are contracted so as to fit snugly upon the driving-shaft, and part p screwed or pinned fast thereon, while part r is arranged to slide endwise and connected by pins s passing through slots in the shaft with a rod, t, which extends centrally through the shaft and outward beyond the end of the same, as shown in Fig. 4, so that, by moving the rod endwise, all the rolls in the machine may be varied in capacity equally and simultaneously.

As a means of adjusting the rod t, its end is threaded and passed through a nut, u, secured to the outer end of the hub of one of the main wheels in such manner that it can rotate freely, but not move laterally.

I am aware that grooved rolls having teeth on the sides of the channel and in the bottom are old.

I am also aware that a series of loose pendent links have been used to elevate the drag-bars, and that various other arrangements have been used to the same end.

Having thus described my invention, what I claim is—

1. The combination of the drag-bars, having curved or bent ends, with the straight rock-shaft, having the series of crank-arms, as described and shown.

2. The combination of a rock-shaft, having arms extended therefrom in opposite directions, with drag-bars having their ends curved and attached to the arms, substantially as described, whereby the bars are adapted to reach around the shaft and maintain their parallelism under the different adjustments.

3. The combination of a wheeled frame, a series of vertically and independently swinging beams or drag-bars, and a rock-shaft mounted on said frame, and provided with a series of rigid depending slotted arms arranged to directly embrace and engage beneath the respective beams, as shown and described.

4. The feed-roll having the V-shaped circumferential channel, provided in the bottom and on both sides with teeth having abrupt front edges and inclined rear edges, as shown.

STACY B. HART.

Witnesses:
P. T. DODGE,
DONN J. TWITCHELL.